No. 737,485. PATENTED AUG. 25, 1903.
F. RIPPLEY.
SPRAYING APPARATUS.
APPLICATION FILED JAN. 16, 1902.
NO MODEL.
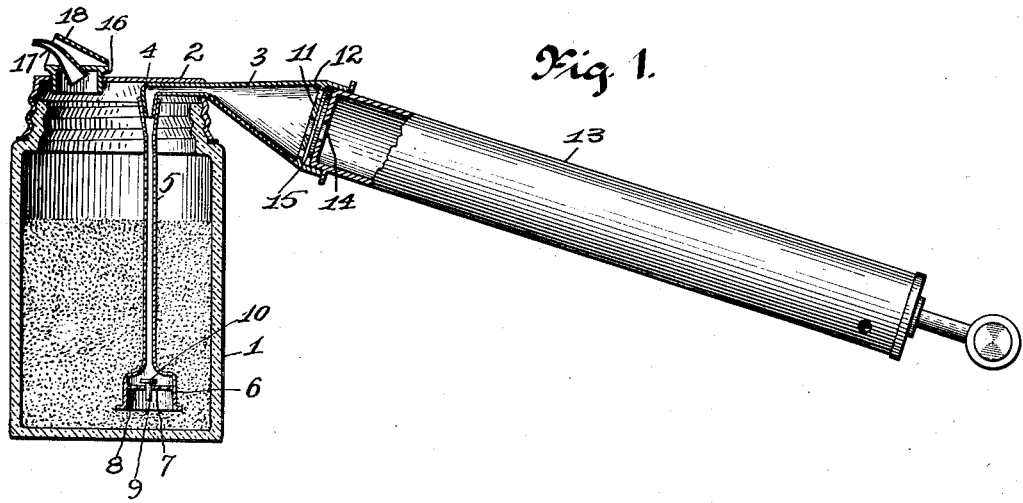
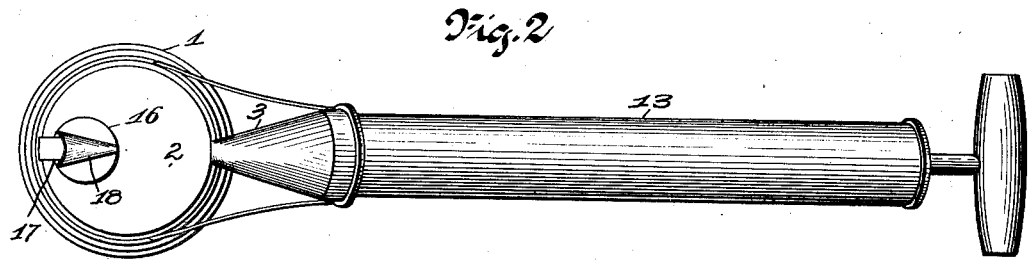
Witnesses
Alfred A. Eicker
John L. Rippey
Inventor
Frank Rippley
By Higdon & Longan attys No. 737,485. Patented August 25, 1903.

UNITED STATES PATENT OFFICE.

FRANK RIPPLEY, OF GRAFTON, ILLINOIS.

SPRAYING APPARATUS.

SPECIFICATION forming part of Letters Patent No. 737,485, dated August 25, 1903.

Application filed January 16, 1902. Serial No. 89,968. (No model.)

*To all whom it may concern:*

Be it known that I, FRANK RIPPLEY, of the city of Grafton, Jersey county, State of Illinois, have invented certain new and useful Improvements in Spraying Apparatus, of which the following is a full, clear, and exact description, reference being had to the accompanying drawings, forming a part thereof.

This invention relates to a spraying apparatus; and it consists of the novel construction, combination, and arrangement of parts hereinafter shown, described, and claimed.

The object of this invention is to provide an improved spraying apparatus for spraying powdered substances and consisting of a receptacle having an air-pump connected thereto, with a tube leading to near the bottom of the receptacle to convey the air thereto and an outlet at the top through which the powdered substance is diffused by the current of air.

In the drawings, Figure 1 is a vertical section illustrating the arrangement of the device to be used for spraying powdered substances. Fig. 2 is a plan view.

In the construction of my improved sprayer I provide a receptacle 1, preferably of glass or some other transparent material and provided with a detachable top 2. A funnel-shaped tube 3 leads through an opening in the top 2, and the inner end thereof is turned downwardly, as indicated by 4. The part 4 is adapted to receive the upper end of a vertical tube 5, which extends downwardly within the receptacle 1 and terminates near the bottom thereof in an enlarged portion 6, substantially funnel-shaped. An integral web 7 is located within the enlargement 6 and is provided with a number of openings 8 to permit the air which is forced through the tube 5 to pass therethrough. A small opening is formed in the center of the web 7, and a vertical pin 9 operates through the said opening and carries a disk 10 on its upper end of sufficient size to close the lower end of the tube 5 when elevated. This acts in the nature of a valve, and its normal position when air is being forced through the tube 5 is that shown in Fig. 1, in which the disk 10 rests upon the web 7, permitting the current of air to pass through the openings 8, and thereby disperse the substance within the receptacle through the outlet.

As above stated, the tube 3 is funnel-shaped and is provided in its outer end with an integral web 11, through which is formed a series of openings 12. The outer end of the tube 3 is of sufficient size to receive the end of an air-pump 13, provided with an opening 14 in its inner end, through which the air is forced and passes through the openings 12 into the receptacle 1. A small disk 15, preferably of flexible material, such as leather or rubber, is located between the end of the pump 13 and the web 11, and when the plunger of the pump is drawn outwardly to recharge the pump the disk 15 will be drawn over the central opening 14, and thereby prevent any of the material within the receptacle 1 from being drawn upwardly through the tube 5 into the air-pump. The valve-disk 10 also serves a like purpose, and when a strong pressure is used and the plunger of the air-pump is withdrawn to recharge the pump the said disk 10 will be raised and assume a position in the lower end of the tube 5, thereby preventing any of the material within the receptacle from being raised into the said tube 5. In this way it may be stated that these two valves coöperate, the valve 10 guarding the tube 5 and the valve 15 protecting the end of the air-pump to prevent entrance thereto to any of the substance within the receptacle which may have passed the said valve 10 and entered the tubes 5 and 3.

A small cup-tube 16 is threaded into an opening in the top 2 and carries a small outlet-tube 17, flattened at its outer end, as shown in Fig. 2, in order to diffuse the substance which is forced therethrough. A shield 18 is integral with the cup 16 and covers and protects the tube 17, preventing it from injury by striking against any solid bodies.

In using my improved sprayer to diffuse the powdered substance over any surface or objects the parts are applied as shown in Fig. 1, and the plunger of the air-pump is operated in the usual manner to force air into the receptacle 1. The valves 10 and 15 will be alternately opened and closed as the plunger operates to permit the air to be forced through the tubes 3 and 5 into the bottom of the receptacle. The air thus being forced into the receptacle will raise the powdered substance and force a portion thereof at each operation of the plunger through the outlet-tube 17, which, as stated, is flattened at its outer end and acts as a sprayer to diffuse the substance. The receptacle 1 is preferably of glass, so that the amount of material contained therein may be perceived at any time.

I claim—

A sprayer, consisting of a suitable receptacle; a tube leading into the top of the receptacle; a second tube detachably connected to the first tube and extending downwardly within the receptacle; a valve in the lower end of said second tube; and an outlet connected to the upper end of the receptacle; substantially as specified.

In testimony whereof I affix my signature in presence of two witnesses.

FRANK RIPPLEY.

Witnesses:

MASON CALLAWAY,

WILLIAM J. BROWER.